UNITED STATES PATENT OFFICE.

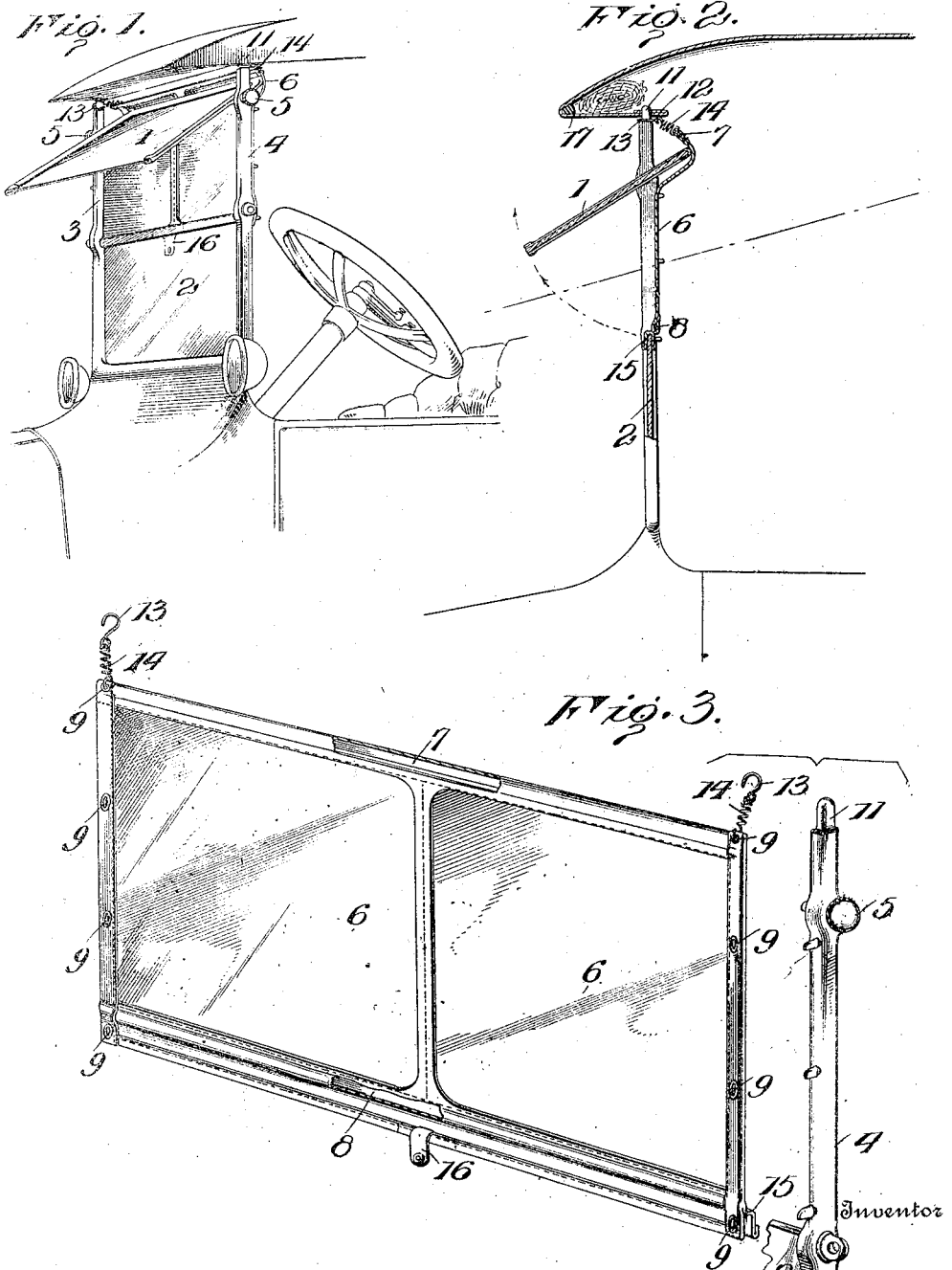

CHARLES R. HOUGH, OF WASHINGTON, DISTRICT OF COLUMBIA.

WIND-SHIELD ATTACHMENT.

1,272,955.   Specification of Letters Patent.   Patented July 16, 1918.

Application filed January 8, 1916. Serial No. 71,050.

*To all whom it may concern:*

Be it known that I, CHARLES R. HOUGH, a citizen of the United States of America, residing at Washington, in the District of Columbia, have invented certain new and useful Improvements in Wind-Shield Attachments, of which the following is a specification.

This invention relates to the wind shields of automobiles or like vehicles, and more particularly to the application thereto of a supplemental shield or curtain adapted to coöperate with a part of the standard equipment of the wind shield, whereby a clear vision is maintained at all times.

The wind shields at present in common use are made up of two transparent pivoted sections, the upper section being pivoted near the top of the inclosing upright, and adapted to be swung outwardly at its bottom, for purposes of ventilation. In rainy weather, when the top section is in its vertical position, the rain or snow will drive directly against the transparent section, thereby more or less obscuring the visual portion thereof and greatly interfering with the safe locomotion of the vehicle.

It is the object of my invention to provide, in wind shields of this character, an attachment adapted, when the upper section is inclined downwardly and outwardly, to close the opening between the uprights caused by displacement of the upper section, with a flexible, transparent member, so positioned that said upper section will act as a water or snow shed and prevent the rain or snow from reaching said member.

In the drawings forming a part of this specification,

Figure 1 is a perspective view of the wind shield provided with my attachment;

Fig. 2 is an enlarged detailed sectional view, and

Fig. 3 is a detailed plan view, partly broken away, of the attachment, and one of the associated uprights.

In said drawings, 1 and 2 indicate respectively the upper and lower transparent sections of a wind shield such as is now in common use, and 3 and 4 the inclosing uprights. The upper section 1 is pivoted near the top thereof at 5, 5, and is adapted to swing on said pivots to the positions shown in Figs. 1 and 2.

My attachment consists of a flexible transparent curtain, or shield, indicated as a whole by 6. Said shield 6 comprises one or more sheets, of mica, celluloid, or similar transparent material, bound at all its edges by stitching or otherwise, to waterproof fabric. I prefer at least two sheets of transparent material, for economy in repair if one sheet becomes broken, but manifestly as many or as few sheets as desired may be used without departing from the spirit of my invention.

As shown in the drawings the upper and lower edges of the shield 6 are provided with a relatively stiff rod 7, 8, adapted to hold the shield in parallelism with the lower section 2 of the wind shield proper. The side margins are perforated, preferably as shown, and provided with eyelets 9, 9, adapted to engage corresponding buttons or rotatable studs, 10, 10, on the wind shield uprights 3 and 4.

In the wind shields now in common use, the uprights 3 and 4 are provided at the top with projections 11, 11, which extend through a portion 12 of the top, and constitute a brace to hold it in engagement with the wind shield. My improved shield 6 is provided at either of its upper edges with a hook member 13, attached to a resilient member 14, preferably a coiled spring, said member 14 engaging the topmost eyelet 9. The hook 13 is adapted to fit around the adjacent projection 11 of the wind shield, and is always under tension imparted by the resilient member 14 thereby taking up any superfluous slack in the upper portion of the curtain 6.

It will be noted that the lower edge of the shield 6 extends well below the top edge of the section 2 of the wind shield, and is fastened in position by the lowest stud and eyelet, the rod 8 preserving the parallelism. But, since rain will sometimes strike the lower portion of the shield 6, I provide the flap 15 connected to the said shield and extending over the edge of the section 2, and down the front face thereof, as shown in Figs. 2 and 3. By this construction it is obvious that any rain or snow which strikes the shield 6, instead of running down into the car, between the inner face of the section 2 and the shield 6, as would be the case without the use of the flap 15, will be deflected thereby upon the outside of the section 2. It is also to be noted that the side margins of the shield 6 are fastened to the uprights 3 and 4, and effectually cover the vertical openings formed between the transparent sections and the uprights, thereby preventing the entrance into the car of any water or snow which would otherwise pass through these openings.

From the foregoing it will be noted that I have provided a supplemental shield which, in any kind of weather, is adapted to not only maintain a clear vision, but to protect the driver of the vehicle from the wind and prevent the ingress of rain or snow. When the section 1 is inclined, as more clearly shown in Fig. 2, the upper portion of the curtain 6 is bulged inwardly to accommodate the upper inturned portions of the section 1, the shield at all times being kept taut by the springs 14. Rain and snow will fall upon the outwardly extending portion of the section 1, from whence it will run downwardly and be discharged upon the hood of the vehicle.

The line of vision of the operator is indicated in Fig. 2, and this line is guarded by the overhang of the section 1. Consequently any rain or snow which may reach the shield 6 will strike below the line of vision.

In detaching the curtain or shield 6, the hooks 13 are removed from the projections 11, and the studs on the uprights are rotated to remove them from the eyelets 9, in the well known manner. The shield is then rolled, the rods 7 and 8 preserving the straight line, and the roll is fastened by a strap or similar device 16, having the ordinary glove fastener snap or a buckle. The roll is then placed in the pocket 17, in front of the top and above the wind shield, said pocket 17 being a part of the usual equipment of automobiles of the present day. It is obvious therefore that the shield may be attached or detached by the driver, without the necessity of leaving his seat.

Modifications of this invention may be suggested to those skilled in the art, but I desire to claim all such embodiments as fall fairly within the scope of the appended claims.

Having thus described my invention, what I claim and desire to secure by Letters Patent is:—

1. The combination with a wind shield having a lower section and an upper section adapted to be swung outwardly, of a flexible transparent member adapted to be detachably secured in position behind said upper section, whereby said section will act as a water shed for said member, and means for holding said member in parallelism with said lower section.

2. The combination with a wind shield having a pivoted section, of a flexible transparent member adapted to be detachably secured in position behind said pivoted section, whereby said section may act as a water shed for said member, and resilient means for tensioning the upper portion of said member.

3. The combination with a wind shield having upper and lower pivoted sections and inclosing uprights carrying projections at the top, of a flexible transparent member adapted to be detachably secured in position behind the upper section to close the opening between said sections when the upper section is swung outwardly, and tension means connecting said member to said projections.

4. The combination with a wind shield having upper and lower pivoted sections and associated uprights, of a flexible transparent member adapted to be detachably secured to said uprights behind the upper section and extending below the top of the lower section, whereby, when the upper section is swung outwardly on its pivots, it will act as a rain shed for said member, a supplemental rain shed connected to said member and extending over the top edge of said lower section and across the front face thereof, and resilient means for tensioning the upper portion of said member.

5. The combination with a wind shield having upper and lower pivoted sections and inclosing uprights having projections at the top, of a flexible transparent member detachably secured to said uprights behind the upper section, and tensile means connecting said member to said projections, whereby the upper portion of said member is under a constant strain.

6. The combination with a wind shield having upper and lower pivoted sections and their inclosing uprights having projections at the top, of a flexible transparent member adapted for attachment at its sides to said uprights and behind the upper section, whereby said section, when swung outwardly, will act as a water shed for said member, springs secured to the top corners of said members and carrying hooks adapted for engagement with said projections and a flap connected to said member near its lower edge, and adapted to extend across the top edge of the lower section and across part of the front face thereof.

7. The combination of a wind shield having upper and lower pivoted sections, a flexible transparent member of substantially the same conformation as each of said sections, said member being provided with apertures on its side edges, hook-carrying springs upon the upper corners, stiffening rods extending longitudinally of the top and bottom edges, and with a flap adapted to extend over the top edge of the lower wind shield section and across the front face thereof, substantially as described.

In testimony whereof I hereto affix my signature in the presence of two witnesses.

CHARLES R. HOUGH.

Witnesses:
 R. M. PARKER,
 RUSSELL L. STEVENS.